United States Patent [19]

Grossman et al.

[11] Patent Number: 4,800,284

[45] Date of Patent: Jan. 24, 1989

[54] FILTER FOR ISOTOPIC ALTERATION OF MERCURY VAPOR

[75] Inventors: Mark W. Grossman, Belmont; William A. George, Gloucester, both of Mass.

[73] Assignee: GTE Products Corporation, Danvers, Mass.

[21] Appl. No.: 947,216

[22] Filed: Dec. 29, 1986

[51] Int. Cl.$^4$ ............................................. G01N 21/00
[52] U.S. Cl. ................................. 250/505.1; 250/436; 422/186; 204/157.2; 350/1.5
[58] Field of Search ................... 250/432 R, 436, 437, 250/423 P, 505.1; 422/186, 186.3; 204/157.2, 157.21, 157.22; 350/1.5, 312

[56] References Cited

U.S. PATENT DOCUMENTS 3,983,019  9/1976  Botter ............................. 204/157.21

FOREIGN PATENT DOCUMENTS 837251  7/1978  U.S.S.R. .

OTHER PUBLICATIONS

Grossman & Maya, "Photochemical Enrichment of $^{196}$Hg", 13th International Quantum Electronics Conference (Jun. 1984).
McDowell et al., "Photochemical Separation of Mercury Isotopes", Can. J. Chem., vol. 37, 1432 (1959).
Webster & Zare, "Photochemical Isotope Separation of $^{196}$Hg by Reaction with Hydrogen Halides", J. Phys. Chem., vol. 85, 1302 (1981).
Deech et al., "Quenching and Depolarization of Mercury Resonance Radiation", Can. J. Phys., vol. 49, 1978–1981 (1971).
Zemansky, "Absorption and Collision Broadening of the Mercury Resonance Line", Phys. Rev., vol. 36, 219 (1930).

Primary Examiner—Carolyn E. Fields
Assistant Examiner—John A. Miller
Attorney, Agent, or Firm—Martha Ann Finnegan

[57] ABSTRACT

A filter for enriching the $^{196}$Hg content of mercury, including a reactor, a low pressure electric discharge lamp containing a fill of mercury and an inert gas. A filter is arranged concentrically around the lamp. The reactor is arranged around said filter, whereby radiation from said lamp passes through the filter and into said reactor. The lamp, the filter and the reactor are formed of quartz, and are transparent to ultraviolet light. The $^{196}$Hg concentration in the mercury fill is less than that which is present in naturally occurring mercury, that is less than about 0.146 atomic weight percent. Hydrogen is also included in the fill and serves as a quenching gas in the filter, the hydrogen also serving to prevent disposition of a dark coating on the interior of the filter.

7 Claims, 4 Drawing Sheets

FIG.3A    EVACUATED FILTER
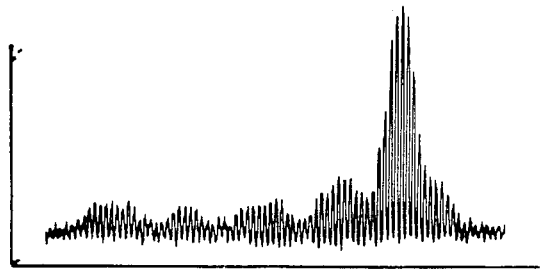
FIG.3B    10T H$_2$
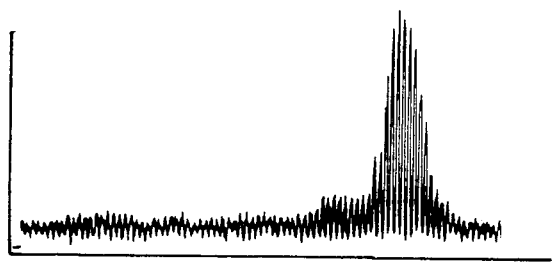
FIG.3C    10T N$_2$
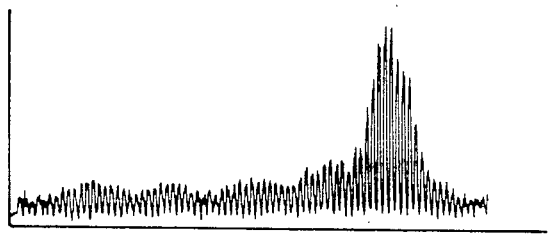
$^N$Hg FILTER T$_F$ = 24°C
$^{196}$Hg LAMP T$_S$ = 20°C
VARIATION OF TRANSMITTED SIGNAL AS A FUNCTION OF FILL GAS AND PRESSURE EFFECT OF $^N$Hg FILTER COLD SPOT TEMPERATURE ON TRANSMITTED HFS IOT HYDROGEN $^{196}$Hg RF LAMP.

FILTER FOR ISOTOPIC ALTERATION OF MERCURY VAPOR

TECHNICAL FIELD OF THE INVENTION

The present invention relates to equipment for use in a photochemical process, and more particularly to equipment for use in a photochemical process for altering the isotopic composition of mercury.

BACKGROUND OF THE INVENTION

The excitation of specific mercury isotopes by photochemical means is well known to the art. For example, the paper by Webster and Zare, "Photochemical Isotope Separation of $^{196}$Hg by Reaction with Hydrogen Halides" J. Phys. Chem. 85, 1302 (1981) discloses such excitation. Mercury vapor lamps are commonly used as an excitation source of mercury isotopes for specific photochemical reactions. To be successful, photochemical separation of a single isotope requires that the spectral band width of the exciting mercury radiation must be sufficiently narrow to excite only the isotope of interest. The specificity depends upon the spectral band width of the source. The rate and extent of separation of the particular isotope from the feed stock can be strongly dependent on the intensity of the radiation emitted from the mercury source.

A weakly ionized plasma of mercury and rare gases under low pressure, in the order of 1 to 3 torr, forms the basis of the fluorescent lamp. Electrical energy is converted to natural mercury resonance radiation at 253.7 nm. at an efficiency of 55 to 65%. This radiation, in fluorescent lamps, is converted to visible light by solid phosphors that are coated upon the lamp envelope. The efficiency of the 253.7 nm. resonance radiation emitted from excited mercury atoms in the plasma is absorbed and reemitted many times by ground state mercury atoms during its escape to the walls of the discharge tube. This trapping of resonance radiation prolongs the effective lifetime of the excited atoms and increases the opportunity for radiationless energy conversion which reduces efficiency.

It is known that the 253.7 nm. resonance line of mercury is composed of five hyperfine components, principally the result of isotope shifting. As is known, the $^{196}$Hg isotope in natural mercury does not contribute substantially to the radiation because of its low concentration, nor does its emission and absorption heavily overlap with the other hyperfine components. Therefore, by increasing its concentration, an additional channel for the 253.7 nm. photons is provided which reduces the average imprisonment time and increases radiation efficiency.

Devices have previously been disclosed to enrich the $^{196}$Hg in mercury feed stocks. In the paper of McDowell et al., "Photochemical Separation of Mercury Isotopes" CAN. J. Chem. Vol. 37, 1432 (1959), a disclosure is made of reacting $^{202}$Hg($6^3P_1$) atoms that are contained in natural mercury with hydrogen chloride with a photochemical reaction in which the $^{202}$Hg atoms are excited during the reaction to precipitate a $^{202}$Hg$_2$Cl$_2$.

As described in a paper delivered by Mark Grossman and Jakob Maya at the International Quantum Electronics Conference, June 1984, very high enrichment of $^{196}$Hg can be achieved in a photochemical reaction using a natural mercury vapor filter. When radiation from a microwave lamp containing mercury enriched to 35% $^{196}$Hg is used in a filter, the filter eliminates substantially all of the non-$^{196}$Hg component radiation permitting an isotopically selective primary excitation of the $^{196}$Hg isotope. Selective excitation of $^{196}$Hg($6^3P_1$) in natural mercury vapor is obtained by an RF-excited, Hg and rare gas source whose emission is filtered through an atomic vapor filter before it enters into the reaction zone.

SUMMARY OF THE INVENTION

In accordance with the present invention there is provided a filter for enriching the content of $^{196}$Hg in a mercury feedstock which flows through a reactor, the filter comprising: an enclosure, at least a portion of which is transparent to the passage of ultraviolet light; a fill of mercury vapor in said enclosure, said mercury vapor having quantities of $^{196}$Hg less than that which is found in naturally occurring mercury.

BRIEF DESCRIPTION OF THE DRAWINGS

In the drawings:

FIGS. 3A, 3B and 3C are curves illustrating, respectively, the relevant portions of the spectral" energy distribution curves of an evacuated filter, a filter with 10 torr of hydrogen, and a filter with 10 torr of nitrogen.

For a better understanding of the present invention, together with other and further objects, advantages an capabilities thereof, reference is made to the following disclosure and appended claims in connection with the above-described drawings.

DESCRIPTION OF THE PREFERRED EMBODIMENTS

The present invention is directed to a novel composition of matter housed in a UV-transparent filter for use in a system to enrich the $^{196}$Hg content of mercury by a photochemical reaction process. The reaction is between "natural" mercury, or possibly previously $^{196}$Hg-enriched mercury, and hydrogen chloride. The filter is particularly useful with a single pass reaction vessel that surrounds the filter, which filter in turn, surrounds a low pressure electric discharge lamp having a fill comprising mercury and an inert gas. The elements of the system, the lamp, the filter, and the reactor are formed of a material which is transparent to radiation at 253.7 nm, such as, for example, quartz or silica. Examples of a low pressure (e.g., about 2.5 torr) electric discharge lamp that are suitable for use in the system can be, for example, any of the known low pressure discharge lamps which transmit radiation in the range of 253.7 nm., especially those using microwave cavities for the excitation of the mercury.

The filter of the present invention is disposed around the lamp and is formed of a pair of concentric cylindrical (or tubular) members that are sealed from the atmosphere. The concentric cylindrical members of the filter are preferably sealed at their ends with a pair of spaced-apart end members, so as to form a cylinder with an axial passageway that receives the low pressure discharge lamp. The filter contains a fill of mercury which is depleted in $^{196}$Hg so that the concentration of $^{196}$Hg is below the quantity that is usually present in naturally occurring mercury, viz. below 0.146 atomic weight percent.

In another aspect of the invention, hydrogen is included in the filter as quenching gas. The inclusion of the hydrogen has been found to inhibit the darkening of the interior of the filter. There may be several reasons for this. As an example, the hydrogen atoms formed during the quenching of excited mercury atoms may react with mercury oxide molecules that could form Hg and H$_2$O. The result is a reduction of the oxide back to elemental Hg. Otherwise the mercury oxide would eventually form an opaque film on the inner filter wall.

The reactor is disposed about the filter and may take the form of a pair of concentric cylinders with inlet and outlet ports through which the mercury feedstock, HCl gas, and other carrier gases can flow. The exciting $^{196}$Hg radiation passes through the lamp envelope, through the filter and into the reactor to produce an isotopic-specific reaction to the $^{196}$Hg in the reaction vessel, whereby $^{196}$Hg$_2$Cl$_2$ is formed.

Figure 1:
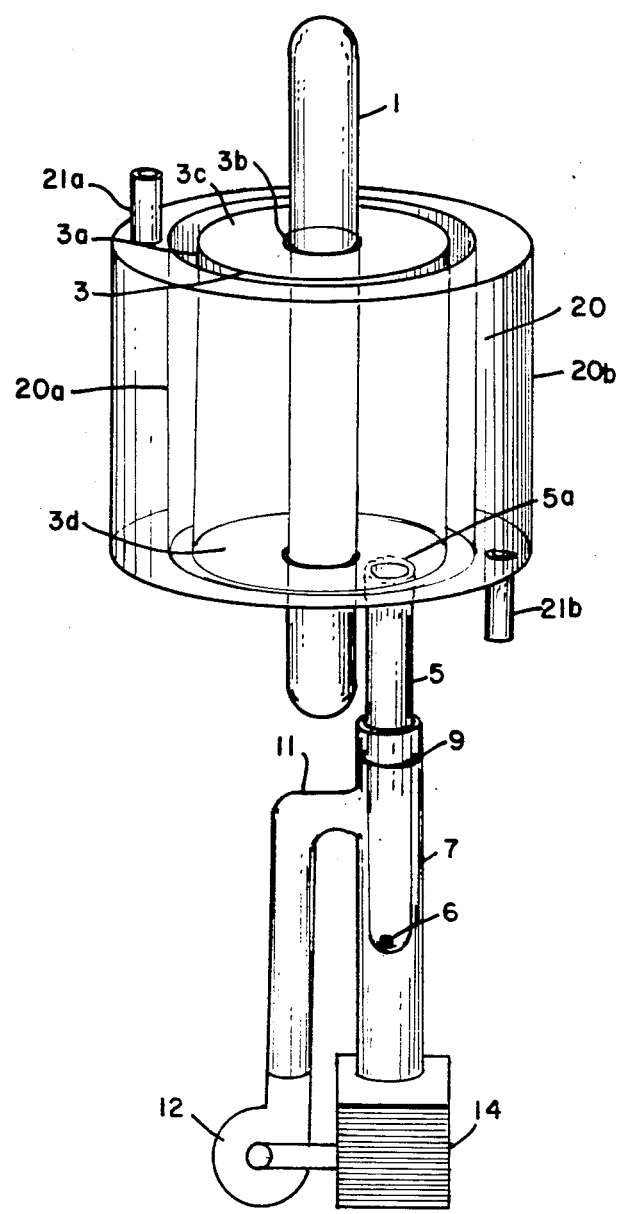
FIG. 1 is a perspective view of an apparatus including a reactor vessel; and a lamp, utilizing the filter according to a preferred embodiment of the present invention.

Referring to FIG. 1 there is shown a low pressure mercury lamp 1 comprising silica or a quartz discharge tube, equipped with microwave cavities disposed at one end thereof. For isotope separation of $^{196}$Hg, the inner diameter of the tube is preferably approximately 5 mm. The discharge lamp 1 typically contains an inert gas, e.g., argon, at a pressure of approximately 2.5 torr and a mercury pressure of approximately 1 to 1.5 millitorr at about 20° C. Although argon is preferred as an inert gas in the lamp, other gases such as neon may be used also.

The filter 3 includes a pair of concentric cylindrical members 3a and 3b spaced from each other at a distance about 1.0 centimeters. The filter 3 is sealed from the atmosphere by a pair of spaced-apart end members 3c and 3d that are fused to the ends of the concentric cylindrical members 3a and 3b. An axial passageway is formed in the filter 3 by the inner cylindrical member 3b and is arranged to receive the lamp 1.

Reference is herein made to the co-pending application, filed on even date herewith, Ser. No. 947,217, entitled "Apparatus For Isotopic Alteration Of Mercury Vapor" (Attorney Docket No. 85-1-122) and assigned to the same assignee as the present application. In a preferred embodiment disclosed therein a means for controlling mercury pressure in the filter comprises a tube 5, which is sealed at one end and in communication with the interior of the filter 3 through port 5a, is disposed on the lower end member 3d. A bead of mercury 6 is disposed at the closed end of the tube 5 and arranged so as to be in communication with the interior of the filter 3. Most preferably, a means for maintaining the mercury at a predetermined temperature is further described in the co-pending application. The temperature maintaining means includes a sleeve 7 disposed about the end of the tube 5 and around the bead of the mercury 6. A sealing ring 9, such as a conventional O-ring, is disposed between the sleeve 7 and the tube 5 to hold the sleeve 7 in place and prevent leakage of heat exchange fluid (preferably water) which passes through the sleeve 7. The heat exchange fluid flows through a "T" connection 11, down sleeve 7 into heater 14 and thence to pump 12 to return to "T" 11. Pump 12 and heater 14 maintain the temperature of the tube at a predetermined level, so as to maintain a predetermined quantity of mercury vapor in the filter.

The reactor 20 is disposed around the filter 3 and includes a pair of spaced-apart concentric sleeves 20a and 20b. A conventional inlet port and outlet port 21a and 21b are disposed on the top and bottom of the reactor 20 to allow for the passage of the mercury feedstock.

Figure 2A:
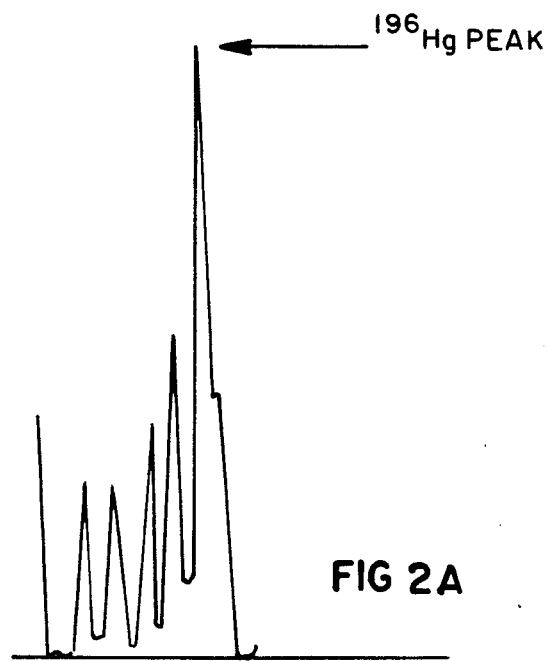
FIGS. 2A and 2B are curves illustrating the relevant portions of the spectral energy distribution curves of, respectively, the emission of a typical low pressure lamp and the emission after the light has passed through the filter of the present invention.
Figure 2B:
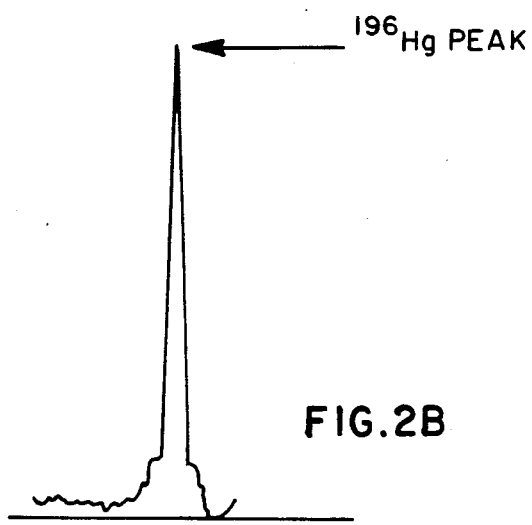

As shown in FIG. 2A, the radiation from the low pressure mercury lamp 1, in the selected 253.7 nm area, has a principal emission peak and five hyperfine peaks to the left of the principal peak. In FIG. 2B, the emission after the light has passed through the filter 3, the hyperfine emissions (peaks to the left of the $^{196}$Hg peak) have been suppressed, thereby reducing the interfering excitation peaks which enter the reactor 20, thereby in turn, reducing the chemical reactions between the HCl and non-$^{196}$Hg isotopes.

The filter 3 is formed with at least a portion of its structure having a glass that is transparent to radiation at 253.7 nm, such as quartz, and is preferably entirely formed of quartz or silica, such that ultraviolet light can pass from the lamp 1 to the reactor vessel 3. The filter 3 contains the previously described fill of depleted $^{196}$Hg-mercury, as contrasted to "natural" mercury that contains 0.146 atomic weight percent $^{196}$Hg isotope. When the $^{196}$Hg concentration is reduced below the levels present in natural mercury, the hyperfine emissions of a mercury isotope other than $^{196}$Hg are reduced.

The absorption coefficient for mercury 196 component is given by the expression:

$$K = AN_{tot} \frac{1.03 \times 10^{-11} \text{cm}^{-1}}{T_k^{\frac{1}{2}}}$$

where

A = 0.146×10$^{-2}$ for ($^{196}$Hg) in natural Hg $T_k$ = vapor temperature in °K.

$N_{tot}$ = total Hg density (cm$^{-3}$)

In the model to be considered, radiation is assumed to pass normally from the lamp through a one cm. filter.

At 50° C., $N_{tot}$ = 4.4×10$^{14}$ cm$^{-3}$:

For natural Hg[$^{196}$Hg] = 0.146%, $K_{196}$ = 0.376, and e$^{-kx}$ = 0.69;

For mercury reduced in $^{196}$Hg to 0.063% (one-half the natural mercury concentration), [$^{196}$Hg] = 0.073%, $K_{196}$ = 0.184, and e$^{-kx}$ = 0.83; and For [$^{196}$Hg] = 0.0%, $K_{196}$ = 0.0, and e$^{-kx}$ = 1.00.

The expression e$^{-kx}$ represents the relative transmitted radiation or I/I$_o$ as given by equation for Beer's law. This approximates the attenuation and together with the assumption of normal transmission through the reactor gap, forms the "slab model".

TABLE I

Calculation Of Improvement In Transmission Of
$^{196}$Hg 253.7 nm Component Through A Filter
Depleted In $^{196}$Hg Using A Slab Model At 50° C.

| $^{196}$Hg Concentration | Absorption Coefficient $K_{196}$ | Exp $(-K_{196}X)$ | % Improvement in Transmission (I) |
|---|---|---|---|
| Natural Hg | 0.376 | 0.690 | 0.0 |
| 50% Depleted $^{196}$Hg | 0.184 | 0.830 | 20.0 |
| 100% Depleted $^{196}$Hg | 0.00 | 1.000 | 45.0 |

As shown in the above Table and with a 1 cm. thick filter, a 20% improvement in transmission of narrow band radiation for $^{196}$Hg excitation can be achieved for a 50% depletion of $^{196}$Hg in natural mercury (0.073% $^{196}$Hg) and a 45% improvement in transmission can be achieved if all the $^{196}$Hg is removed.

The filter is filled with a mixture of quenching gas and mercury vapor and as previously mentioned, the filter contains the depleted $^{196}$Hg and hydrogen, the latter serving as a quenching gas. As mentioned above, the use of hydrogen reduces the disposition of a dark coating on the inside of the filter, which has been observed to occur with other quenching gases. Heretofore, nitrogen has been used to act as a quenching gas. When compared to using hydrogen as as quenching gas, a nitrogen quenching gas is less than fully satisfactory.

The mercury filter needs to absorb non-$^{196}$Hg radiation which could excite non-$^{196}$Hg isotopes, and the hydrogen serves as a quenching gas. Quite unexpectedly, it has been found that the hydrogen does not form stable by-products in the herein described mercury filter environment, which appears to be the case with other quenching gases previously used. When using hydrogen as a quenching gas, radiation of the mercury is converted to non-radiative energy through collisions.

As can be seen in FIG. 3B, with a filter having 10 torr $H_2$, there is a significant depression of the emission lines to the left of the principal $^{196}$Hg emission line in the curve. With a nitrogen fill, as shown in FIG. 3C, emission lines attributable to non-$^{196}$Hg isotopes occur. Such is also the case with the curve shown in FIG. 3A which illustrates the lamp emission after passing through a filter containing only mercury.

Figure 4A:
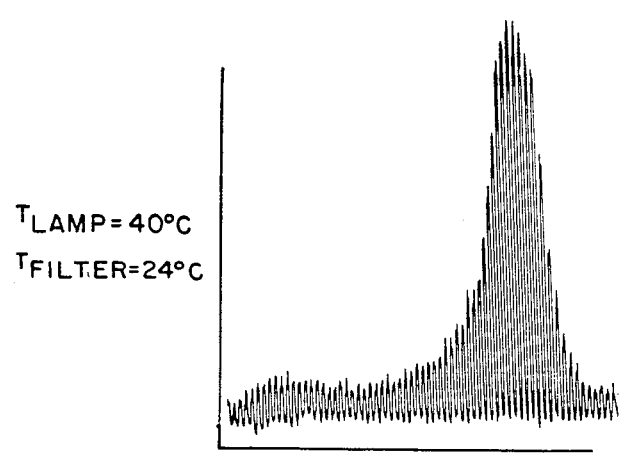
FIGS. 4A, 4B and 4C are curves illustrating, respectively, the relevant portions of the spectral energy distribution curves of the emission from a filter operated at 24°, 16° and 8° C. The curves are based upon emissions from a low pressure microwave discharge mercury lamp with 2 Torr argon and $^{196}$Hg in concentrations of 35 atomic weight percent. The filter contains mercury with 0.146 atomic weight percent and 10 Torr hydrogen.
Figure 4B:
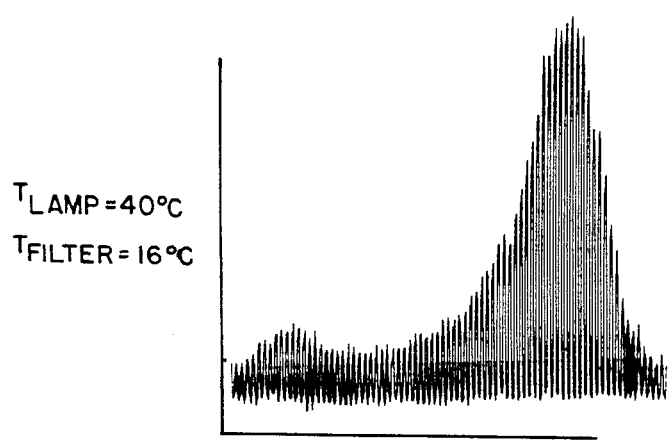
Figure 4C:
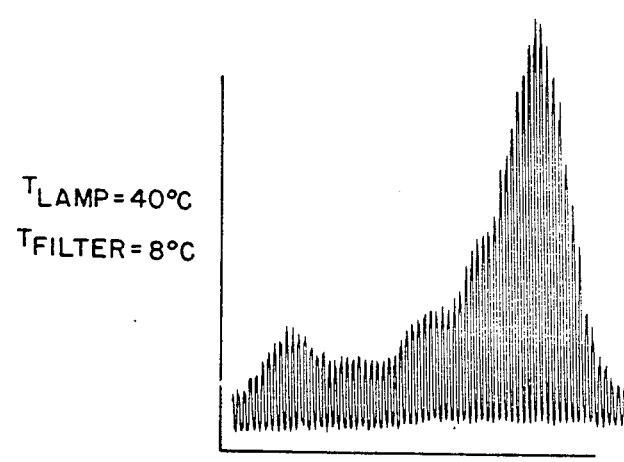

Without being limitative on the scope of the present application, the following specific example is offered:

A filter having a thickness of 10 mm. with a fill of $H_2$ as a buffer gas at a pressure of 10 torr was used. The excitation lamp diameter was 5 mm. and had a fill of argon and mercury and operated at a gas fill pressure of 2.5 torr at 20° C. The filter contained mercury that was 50% depleted in $^{196}$Hg (approximately 0.073 atomic weight percent $^{196}$Hg). The filter was operated at a temperature of approximately 40° C. which provides substantial non-$^{196}$Hg isotope emission suppression. The suppression of the non-$^{196}$Hg isotopes is shown in that in FIG. 4C at a filter temperature of 8° C., hyperfine emissions to the left of the principal $^{196}$Hg peak are less suppressed than at 16° C., as shown in FIG. 4B, and less suppressed than at 24° C. as shown in FIG. 4C.

The feedstock into the reactor was natural mercury which flowed at a rate of 19 milligrams per hour, together with HCl at a rate of 100 sccm (standard cubic centimeters per minute) and argon at a rate of 80 sccm. Upon measurement, the mercury was enriched from the 0.146 atomic weight percent $^{196}$Hg to 1.6 atomic weight percent. The enrichment of $^{196}$Hg can be accomplished as disclosed in a co-pending application entitled: "High Feedstock Utilization Process for $^{196}$Hg Enrichment in a Photochemical Flow Reactor" (Attorney Docket No. 86-1-010), Ser. No. 917,218, filed on even date herewith, and assigned to the same assignee as the present application.

It is apparent that modifications and changes can be made within the spirit and scope of the present invention, but it is our intention, however, only to be limited by the scope of the appended claims.

What is claimed is:

1. A filter for enriching the content of $^{196}$Hg in a mercury feedstock which flows through a reactor, said filter comprising:
    an enclosure, at least a portion of which is transparent to the passage of ultraviolet light;
    a fill of mercury vapor in said enclosure, said mercury vapor having quantities of $^{196}$Hg less than that which is found in naturally occurring mercury.

2. The filter according to claim 1 wherein the mercury pressure is between about 9 and 13 millitorrs.

3. The filter according to claim 2 wherein the concentration of $^{196}$Hg in the mercury of the fill is greater than or equal to 0 and less than about 0.146 atomic weight percent.

4. A filter for enriching the content of $^{196}$Hg in a mercury feedstock which flows through a reactor, said filter comprising:
    an enclosure, at least a portion of which is transparent to ultraviolet light; and
    a fill of mercury vapor and hydrogen in said enclosure, said mercury vapor having quantities of $^{196}$Hg less than that which is found in naturally occurring mercury.

5. The filter according to claim 4 wherein the concentration of $^{196}$Hg is between about 0.0 and less than about 0.146 atomic weight percent.

6. The filter according to claim 4 wherein the hydrogen is at a pressure between about 7 and 13 torr.

7. The filter according to claim 4 wherein the mercury pressure is between about 10 and 14 millitorrs.

* * * * *